July 26, 1949. H. S. BLOCH 2,476,955
PRODUCTION OF DRYING OILS
Filed May 31, 1946 2 Sheets-Sheet 1
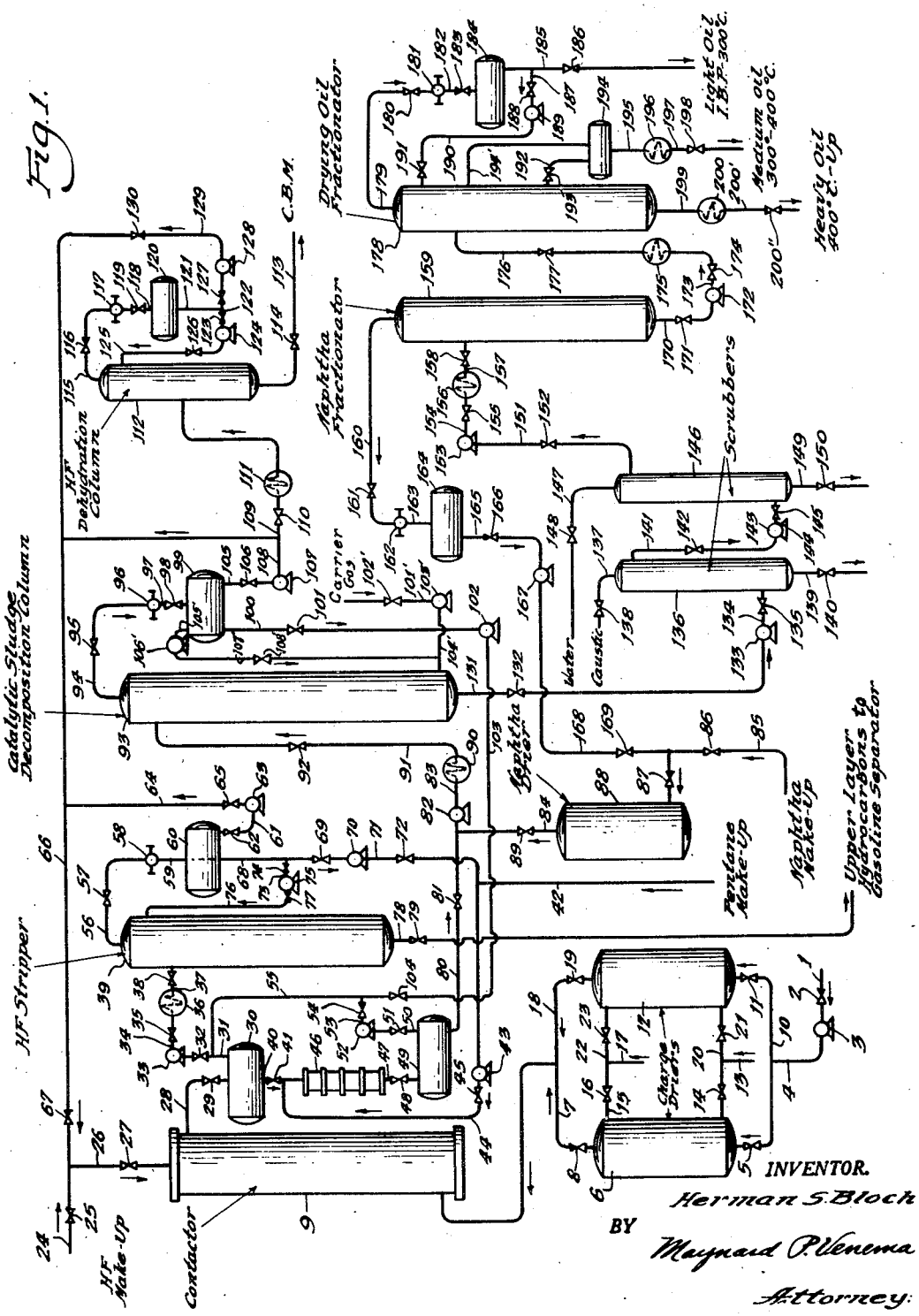
INVENTOR.
Herman S. Bloch
BY Maynard P. Venema
Attorney

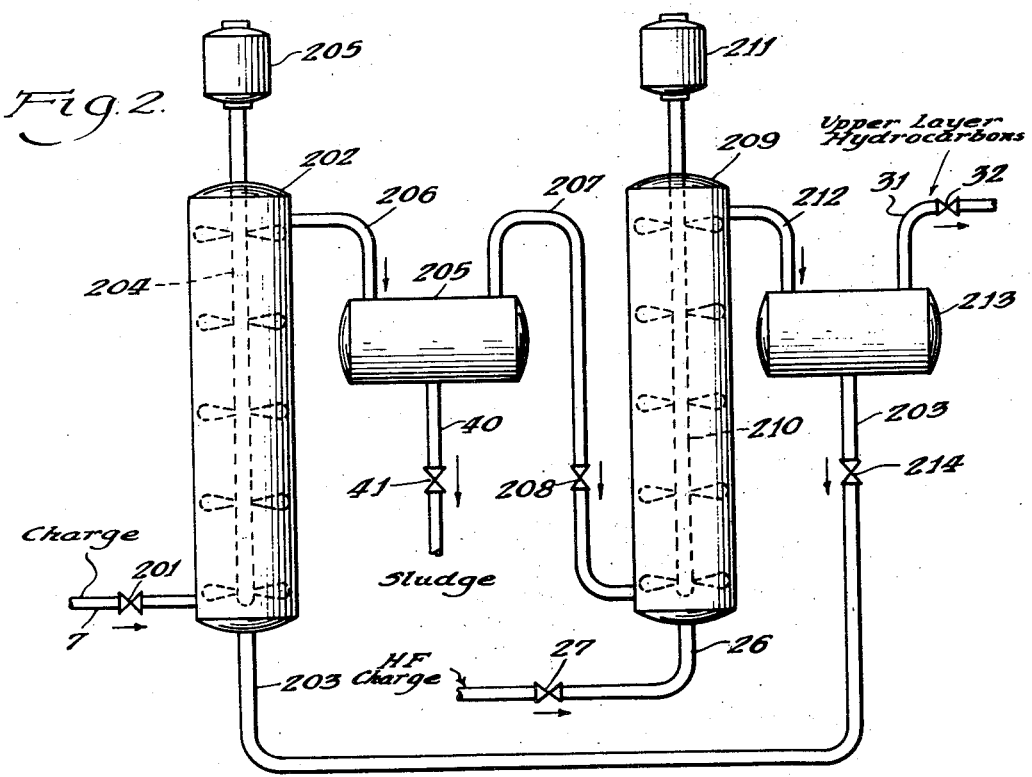
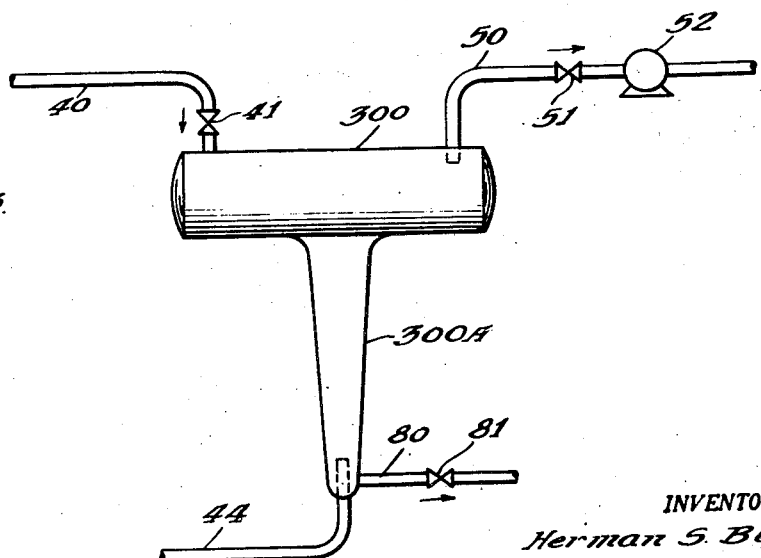

UNITED STATES PATENT OFFICE 2,476,955

PRODUCTION OF DRYING OILS

Herman S. Bloch, Chicago, Ill., assignor to Universal Oil Products Company, Chicago, Ill., a corporation of Delaware Application May 31, 1946, Serial No. 673,483

18 Claims. (Cl. 260—666)

The present invention relates to the production of high molecular weight polyolefinic hydrocarbons which are particularly suitable for use as drying oils and as intermediates for the production of resins and other products requiring highly unsaturated non-aromatic hydrocarbons as starting material. The invention concerns more specifically the production of said drying oils from olefinic hydrocarbon charging stocks by reacting the same with substantially anhydrous hydrogen fluoride and further, it relates to a process therefor which involves a particular flow of reagents and charging stock and a specific means of effecting the separation of the drying oil from an intermediate product formed during the process.

It is one object of the present invention to provide a process for the production of a hydrocarbon drying oil having a maximum degree of conjugated and non-conjugated unsaturation by maintaining reaction and recovery conditions such that polymerization of said drying oil hydrocarbons is maintained at a minimum.

It is another object of the invention herein disclosed to provide a particularly advantageous process flow and plant design for the commercial production of a hydrocarbon drying oil.

Still another object of the invention is to recover a valuable by-product hydrocarbon material from the present process which is utilizable as a high octane motor fuel.

A further object of the invention is to provide a process for the production of a hydrocarbon drying oil wherein a maximum recovery of reagents and catalysts utilized in the process of the invention is effected, and the recovery thereof in a condition suitable for recycling in the process. One embodiment of the present invention comprises contacting an olefinic hydrocarbon containing at least 4 carbon atoms per molecule with substantially anhydrous hydrogen fluoride, separating from the products thereof, a sludge phase containing a predominant proportion of the hydrogen fluoride originally charged in chemical combination with a hydrocarbon as a complex addition compound thereof, decomposing said sludge in the presence of a metallic catalyst, hereinafter more fully described, separating a hydrogen fluoride phase and a hydrocarbon phase from the resultant product, and contacting said hydrocarbon phase with an alkaline reagent to remove therefrom residual dissolved hydrogen fluoride.

In one specific embodiment of the process comprising the present invention, a drying oil hydrocarbon is prepared by the following successive series of steps: A polymer gasoline formed by mixed polymerization of propylene and butylene, the product of which is fractionated to separate a portion boiling from about 30° to about 250° C., is intimately contacted with substantially anhydrous hydrogen fluoride in an amount ranging from about 0.1 to about 10 weight proportions of hydrogen fluoride to gasoline for a period of time within the range of from about 3 to about 90 minutes to form a product which upon settling separates into an upper hydrocarbon phase containing predominantly saturated hydrocarbons suitable for use as a high octane number motor fuel (herein referred to as the "upper hydrocarbon layer") and a lower layer sludge phase containing a predominant proportion of the hydrogen fluoride charged to the reaction combined in the form of hydrocarbon-hydrogen fluoride complex addition compounds. The latter complex or sludge phase is separated and intimately contacted with liquid pentane to extract from said sludge the saturated hydrocarbons dissolved and/or entrained therein during the prior sludge-forming reaction, the lower immiscible sludge layer is then separated from said pentane and mixed with a hydrocarbon naphtha fraction boiling from about 130° to about 140° C., and the resultant mixture passed over a sludge decomposition catalyst comprising metallic copper at a decomposition temperature and pressure to release hydrogen fluoride therefrom and form thereby a bottoms product comprising said drying oil hydrocarbon dissolved in said naphtha. The naphtha solution of the drying oil hydrocarbon is washed with a dilute aqueous solution of caustic followed by a further washing thereof with water, the naphtha hydrocarbons fractionated therefrom and a bottoms product separated from the fractionation which comprises said drying oil hydrocarbons.

Other specific embodiments of the present invention refer to alternative methods of conducting the individual steps of the process comprising said invention which include, among others, the following important modifications of the principal process, which although in the alternative, are distinct improvements in said process resulting in an increased yield of drying oil having a superior quality and a maximum recovery of reagents and catalyst employed in said process:
(1) An improved method of contacting the hydrocarbon charging stock and hydrogen fluoride in the original sludge-forming reaction comprising countercurrent flow of said charge stock and hydrogen fluoride to increase thereby the yield of drying oil product ultimately recovered from a given amount of charge stock and also to improve the quality thereof. (2) a sludge extraction step which comprises contacting the sludge product formed in the prior sludge-forming stage with an inert liquid hydrocarbon such as pentane to remove therefrom, the entrained and dissolved non-drying hydrocarbons normally present in said sludge which, if not removed from the sludge by a prior treatment such as the present extraction stage, appear in the final drying oil product. The above non-drying hydrocarbons, usually saturated in character, dissolved and/or entrained in the sludge are desirably removed from the same prior to the sludge decomposition stage for the reason that when the non-drying hydrocarbons are allowed to remain in the sludge, the drying oil hydrocarbons recovered in the sludge decomposition stage of the process possess an inferior drying efficiency and generally result in the formation of tacky or incompletely dried films when said drying oil is utilized as a paint or varnish ingredient. (3) The utilization of a petroleum naphtha fraction to dilute the drying oil hydrocarbons released in the sludge decomposition stage and thereby reduce or entirely eliminate the inter-polymerization of the drying oil hydrocarbons during the decomposition of said sludge. The dilution effect of said naphtha is essentially a mass action effect whereby the unsaturated drying oil hydrocarbons are dispersed in said naphtha to reduce the possibility of inter-polymerization, which is allowed to proceed unchecked, greatly increases the molecular weight of the individual drying oil hydrocarbons and converts the latter into hydrocarbons containing fewer unsaturated double bonds, the resultant hydrocarbons being less satisfactory as drying oils. (4) An improvement in the catalytic sludge decomposition stage of the present process which comprises utilizing an inert gaseous carrier, introduced into the bottom of the sludge decomposition reactor to flow upward therein countercurrent to the downward flow of sludge, thereby to strip the hydrogen fluoride released by the catalytic sludge decomposition out of the reactor and from contact with the drying oil hydrocarbons simultaneously released when the sludge contacts the decomposition catalyst. (5) An improved apparatus for contacting the inert liquid hydrocarbon extractant (preferably pentane as indicated above) with the sludge to remove therefrom the non-drying oils as hereinabove indicated, such apparatus comprising a settling vessel containing an acid leg attached thereto as shown diagrammatically in Figure 3 and hereafter more fully described. Said acid leg provides for countercurrent extraction of the sludge with the hydrocarbon extractant in a simplified condensed form of apparatus. (6) The vacuum distillation of the drying oil product to separate specific fractions having certain desirable properties for the preparation of derivative products therefrom. It is to be emphasized that the above recitation of distinctive features of the present drying oil process comprising this invention is by no means complete, but others will be referred to in the following specifications.

The procedure specified herein for the production of the present drying oil product as briefly outlined in the above embodiments and the alternative modifications thereof as set forth in the above specific embodiments, will be amplified by describing a typical operation in connection with the attached flow diagram in Figure 1 which shows diagrammatically by the use of conventional figures, generally in elevation, an arrangement of the specific units of apparatus and the flow of reagents and charge involved in the present process wherein the objects set forth above may be accomplished. The units of apparatus shown in the drawing are not to any exact or relative scale and are not intended to limit the scope of the invention in strict accordance thereto or otherwise.

Referring to Figure 1, a suitable olefinic hydrocarbon charging stock is admitted under sufficient pressure to maintain the same in liquid phase at ordinary temperatures to charging pump 3 by way of line 1 containing valve 2. Said hydrocarbon charging stock is discharged through line 4 containing valve 5 into an apparatus for removing moisture therefrom and thus prevent or reduce dilution with water of the anhydrous hydrogen fluoride reagent subsequently utilized in the process to catalyze the formation of the drying oil product.

Before proceeding further with the description of the process and apparatus for drying the charging stock and the subsequent steps of the process, it is advisable to define in more concrete terms the nature of the hydrocarbon charging stock utilizable in the present process. The types of compounds which yield desirable sludges and ultimately the desired drying oil product, in general, are the aliphatic and cyclic non-aromatic hydrocarbons, that is, the straight and branched chain or cyclic olefinic and branched-chain paraffinic hydrocarbons. Of the above general classes of hydrocarbons utilizable herein, the highly branched chain paraffins containing at least 4 carbon atoms per molecule and the straight or branched chain mono- or polyolefins or acetylenes, as well as cyclic olefins are the preferred starting materials, since these hydrocarbons form sludges which when treated in accordance with the present process yield a drying oil product composed chiefly of hydrocarbons having the desired molecular weight (preferably from about 250 to about 600); said hydrocarbon product also contains highly unsaturated components containing olefinic double bonds in a preferred conjugated relation to one another. The charging stock, moreover, may comprise simply a single hydrocarbon component of suitable structure, but if a mixture of hydrocarbons such as a suitable petroleum fraction, is more available, the process may be operated utilizing said mixture as charging stock. The components, further, may be of diverse structure, but no substantial proportion of said mixture should be of aromatic character. I have found that it is desirable to maintain as low an aromatic content in the feed as possible, because the yield of desirable drying oil is lowered in direct proportion to the aromatic content of the feed stock. Typical of the hydrocarbon mixtures which I have found to be especially suitable in the formation of a hydrogen fluoride sludge are certain fractions of cracked or polymer gasoline (preferably the latter) having a boiling range of from about 30° to about 250° C. If a cracked gasoline is selected as the charging stock it is desirably fractionated to separate a portion low in aromatic content, or is given a prior extraction treatment to remove aromatic hydrocarbons therefrom.

The hydrocarbon charging stock introduced into the process through lines 1 and 4 is dried by passage through dryer 6 which contains a suitable dessicant such as anhydrous alumina distributed on trays or merely packed as rigid particles in said dryer 6. The hydrocarbon charge flows through the granules of dessicant, emerges from the top of dryer 6, through line 7, containing valve 8 and flows therefrom into the sludge-forming reactor indicated on the diagram as contactor 9, hereinafter described. The dessicant distributed in dryer 6 gradually becomes inactive by continued adsorption of increasing quantities of moisture from the charge so that the dessicant must either be replaced or regenerated to accomplish further drying.

To provide for continuous flow of hydrocarbon charge into the process, an auxiliary drying vessel is maintained in parallel relationship to dryer 6 by connecting line 4 to line 10, closing valve 5 and diverting the charge into line 10, through valve 11, into dryer 12 containing fresh dessicant. The hydrocarbon charge flows through the dryer as described for dryer 6 and emerges therefrom through line 18 containing valve 19 into line 7 which leads to the sludge forming contactor 9. Although two vessels are indicated as dryers, the drying system may comprise any number of vessels in series or parallel in order to accomplish the desired degree of drying.

While the charge is thus diverted through auxiliary dryer 12 the dessicant in dryer 6 may be regenerated, said regeneration usually being accomplished by passage of a heated inert gaseous material over the dessicant until the water content thereof is lowered to a point at which the dessicant will again dry the hydrocarbon charge effectively. For the purpose of regeneration, the inert gas which may be nitrogen, carbon dioxide or a low molecular weight paraffinic hydrocarbon, such as propane or butane, is introduced into line 13 at a temperature of from about 150° to about 200° C., through valve 14 into the bottom of dryer 6 and flows upwardly therethrough, issuing from the top of dryer 6 through line 15, valve 16 and line 17 to be recycled or discharged from the process. When the dessicant in drying vessel 12 reaches the point at which it becomes ineffective for further drying of the charge, the flow of hydrocarbons is again diverted into regenerated drying vessel 6 by closing valve 11 and opening valve 5. The regeneration of the dessicant in vessel 12 is then accomplished by closing valve 14 and forcing the heated inert gas through line 20 and valve 21 into the bottom of vessel 12. The inert gas, laden with moisture from the dessicant, flows from the top of vessel 12 through line 22, valve 23 and line 17 to be discharged from the process or recycled therein.

The dried hydrocarbon charge flowing from drying vessel 6 through line 7 enters sludge-forming contactor 9 through the bottom of the apparatus provided therefor and therein contacts substantially anhydrous hydrogen fluoride for the production of the hydrogen fluoride sludge from which the present drying oil is derived. In preparing the hydrogen fluoride sludge for the process of this invention, the hydrocarbon charging stock is contacted for a period of time, not exceeding about 2 hours, with approximately anhydrous hydrogen fluoride which may contain a maximum of about 10% of water but is preferably of from about 95 to about 99+% concentration, at a temperature within the range of from about −20° to about 200° C. (preferably from about 30° to about 125° C.) and at a superatmospheric pressure sufficient to maintain the reactants in liquid phase during the reaction. The hydrogen fluoride is introduced from storage into line 24 through valve 25, line 26, and valve 27 into the top of the hydrogen fluoride sludge contactor, and being heavier than the hydrocarbon phase, it tends to gravitate toward the bottom of the contactor where it meets fresh incoming hydrocarbon charging stock entering through line 7. The weight ratio of hydrogen fluoride to hydrocarbons maintained in contactor 9 may range from about .05 to about 10 proportions of hydrogen fluoride to hydrocarbons, preferably at about a 1:1 to about a 0.5:1 ratio.

Although the hydrogen fluoride sludge contactor, vessel 9 on the diagram, is indicated as a tube reactor, any suitable apparatus or reactor may be utilized to contact the hydrocarbon reactant with the liquid hydrogen fluoride catalyst in contactor 9. It is desirable that very intimate contact between the liquid hydrocarbon charge and hydrogen fluoride be maintained for a period of time sufficient for the reaction to proceed to substantial completion (usually after a period of about one-fourth hour to about two hours). In general, some form of agitation, such as mixing, stirring, etc., is used, which forms an intimate mixture or emulsion of hydrocarbon and hydrogen fluoride. One particular form of apparatus which I have found to be especially desirable is indicated in Figure 2 of the attached diagram, hereinafter described. The arrangement of the vessels indicated in Figure 2 is intended to obtain maximum sludge production from a given charge of hydrogen fluoride and hydrocarbons at a maximum efficiency in the formation of the sludge. The dried hydrocarbon charge indicated as issuing through line 7 from the drying vessel in Figure 1 enters line 7 in Figure 2, passes through valve 201 and is charged into the bottom of vessel 202 where it contacts partially used hydrogen fluoride, the source of which is hereinafter referred to and which enters vessel 202 through line 203. The hydrocarbons and used hydrogen fluoride are intimately mixed or emulsified as they flow upwardly through vessel 202 by stirrer 204 maintained rapidly revolving by motor 205. The hydrogen fluoride sludge emulsion issued from the top of vessel 202 and enters sludge settler 205 by way of line 206. In vessel 205, the sludge emulsion formed in contactor 202 is allowed to settle and stratify into a heavier sludge layer and an upper hydrocarbon layer. The sludge is removed from settler 205 through line 40 and valve 41 into an apparatus subsequently described for further processing of the sludge. The upper hydrocarbon layer separating in settler 205 is removed through line 207 and valve 208 and charged into the bottom of a second sludge-forming contactor indicated in Figure 2 as vessel 209. The upper layer hydrocarbons separated in settler 205 ordinarily contain a quantity of less reactive hydrocarbons which do not form a hydrogen fluoride sludge as readily as the more reactive hydrocarbon components of the charging stock. The hydrocarbons introduced into vessel 209 are contacted with the more reactive fresh hydrogen fluoride introduced through line 26 and valve 27 into the bottom of vessel 209. As indicated for vessel 202 a stirrer is also maintained in vessel 209 to effect intimate contact of the hydrogen fluoride with the hydrocarbon charge. Stirrer 210 directly attached by shaft to motor 211 is thus provided for accomplishing the desired mixing of the hydrocarbons and hydrogen fluoride. The effluent from vessel 209 is conveyed by line 212 into settler 213 where said effluent separates into a bottom layer containing substantially all of the hydrogen fluoride charged and comprises the partially used hydrogen fluoride hereinbefore referred to which is withdrawn from vessel 213 through line 203 and valve 214 and is directed into vessel 202 as previously noted for contacting the fresh hydrocarbon charge. The upper hydrocarbon layer separating in settler 213 is removed through line 31 containing valve 32 and treated as subsequently indicated herein to recover therefrom a valuable by-product high octane motor fuel.

Returning to Figure 1 for the description of the present process, the products formed in hydrogen fluoride sludge contactor 9 are transferred through line 28, and valve 29 into sludge settler 30 where a two layer system separates on breaking of the emulsion of hydrogen fluoride sludge and "upper layer" hydrocarbons formed in vessel 9. The desired sludge layer separating in settler 30 contains a predominant proportion of the hydrogen fluoride originally charged to the system in the form of a hydrocarbon-hydrogen fluoride complex from which the present drying oil is derived after removal of the hydrogen fluoride from said complex. The sludge separating as the lower layer in vessel 30 is removed through line 40 containing valve 41 and as it flows therethrough it is mixed with the inert saturated liquid hydrocarbon heretofore mentioned for extracting the dissolved and/or entrained non-drying hydrocarbons from the sludge. The hydrocarbon extractant, indicated on Figure 1 as pentane which comprises a preferred material for such purposes (although other inert low boiling hydrocarbons such as butane or propane may be used) is introduced through line 42 under pressure supplied by pump 43 into line 44 containing valve 45. Line 44 connects with line 40 and at the point of juncture the sludge and extractant mix prior to introducing the mixture into mixer 46. In preparing a synthetic drying oil from a hydrogen fluoride-hydrocarbon complex, I have found that the drying oil recovered from said complex often drys to a film which is permanently sticky and tacky rather than to one which is hard and firm to the touch as is required in coating compositions unless the sludge, prior to separation of the drying oil therefrom, is treated with the inert hydrocarbon extractant to remove certain undesirable hydrocarbons entrained or dissolved in the sludge. If the hydrogen fluoride sludge complex is treated or extracted in the manner indicated, the resulting drying oil product has greatly improved drying properties and sets to a firm hard film because the pentane extractant has removed certain saturated hydrocarbons which boil too high to evaporate but yet are not separable from the drying oil hydrocarbons by subsequent fractionation and which if allowed to remain in the resultant product do not dry as the unsaturated drying oil hydrocarbons do, but act as tackifying agents in the drying oil composition.

The pentane introduced through line 44, into line 40 carrying the sludge from settler 30 is intimately mixed with the sludge by passage through mixer 46 which may contain a series of baffles or orifices where the pentane is tortuously mixed with the sludge to form an emulsion. The latter emulsion is withdrawn through line 47 and valve 48 and introduced into pentane settler 49 where the emulsion is allowed to separate into two distinct layers, an upper pentane layer containing a small percentage (generally not exceeding about 1%) of hydrogen fluoride and a lower extracted sludge layer. The upper pentane layer is transferred by means of pump 52 from settler 49 through line 50 containing valve 51 into line 53 containing valve 54, said line 53 connecting with line 55 which in turn transfers the pentane containing dissolved hydrogen fluoride into line 31 hereinafter referred to.

The upper hydrocarbon layer separating in sludge settler 30 has dissolved therein a small amount of hydrogen fluoride in the order of about 1% by weight of said upper layer. Since the dissolved hydrogen fluoride is a relatively valuable catalyst in the present process, which may be separated from the hydrocarbon layer and returned into the process flow, it is desirably removed therefrom before the latter is discharged from the process. Said upper layer is withdrawn from sludge settler 30 through line 31 containing valve 32 and is introduced by means of pump 33 through line 34 containing valve 35, heat exchanger 36 and line 37 containing valve 38 to hydrogen fluoride stripper 39 which is usually a fractionating column either packed with suitable contact materials, such as stainless steel jack chain or contains bubble decks of the ordinary design. Heat exchanger 36 may be employed as a heating or cooling means depending upon the temperature of the upper layer hydrocarbons and pentane charged into the hydrogen fluoride stripper 39. It is generally preferred that the temperature of the hydrocarbon-hydrogen fluoride mixture introduced into stripper 39 be at least about 50° C. to provide for sufficient volatility of the hydrogen fluoride and enable the latter to flash overhead when the charge is admitted into said stripper 39.

In stripper 39 the hydrogen fluoride dissolved in the upper hydrocarbon layer formed in contactor 9 and the pentane-hydrogen fluoride solution separated in pentane settler 49 are flashed over-head from stripper 39 through line 56 containing valve 57 and passed into condenser 58 where the light hydrocarbon vapors and hydrogen fluoride are condensed into a liquid fraction which enters receiver 60 through rundown line 59. The hydrogen fluoride removed over-head in column 39 is present in receiver 60 in substantial excess of its solubility in the pentane present and therefore two layers are formed in receiver 60. The lower hydrogen fluoride layer is withdrawn through return line 61 containing valve 62 and is supplied by means of pump 63 through line 64 containing valve 65 to line 66 containing valve 67 thereby conveying the return hydrogen fluoride either into line 24 and HF make-up or storage or into line 26 for recycle into contactor 9. The upper hydrocarbon layer consisting chiefly of pentane in receiver 60 is withdrawn through line 68 containing valve 69 and recycle pump 70 which returns the pentane through line 71 containing valve 72 into pentane supply line 42 and connects therewith for recycling the pentane to the sludge extraction stage. A substantial portion of the pentane, however, is desirably withdrawn from line 68 through line 73 containing valve 74 and is forced by pump 75 via line 76 containing valve 77 into the upper portion of column 39 to provide the requisite hydrocarbon reflux in the fractionation effected in column 39.

The saturated hydrocarbons formed in the contacting stage of the present process which separate from the sludge as an upper hydrocarbon layer in sludge settler 30 contain a number of saturated hydrocarbons boiling in the gasoline range and as such are particularly desirable as high octane fuel components. The latter hydrocarbons which boil at a temperature higher than the pentane or hydrogen fluoride separated in column 39, therefore accumulate as a bottoms fraction in the latter column. The latter fraction is removed through line 78 containing valve 79 and is discharged from the process or transferred to a gasoline separation zone for the removal of desirable gasoline boiling range fractions therefrom, not indicated on Figure 1.

The present invention includes as a preferred embodiment thereof, an improved method of conducting the sludge extraction stage wherein the sludge is intimately mixed with an inert saturated hydrocarbon extractant such as pentane, and the latter extractant together with undesirable hydrocarbons dissolved and/or entrained in the sludge are subsequently allowed to separate from the sludge and withdrawn. The improvement herein referred to eliminates the multiplicity of apparatus associated with the process described in Figure 1, the apparatus comprising mixer 46 and pentane settler 49. Said improvement provides a highly efficient unit apparatus for accomplishing the purpose of the above combination of apparatus. The improved device is essentially a sludge settler containing an acid leg wherein pentane is introduced to extract the sludge in countercurrent flow with said sludge. Figure 3 illustrates the improved apparatus referred to in the present embodiment. For the purpose of this process, the hydrogen fluoride sludge layer separating in settler 30 is removed therefrom through line 40 containing valve 41 and introduced into sludge extractor 300. The sludge immediately flows into acid leg 300A, an integral part of the extractor, finally filling the acid leg and eventually entering the horizontal tank-like portion of the apparatus. Liquid pentane is thereupon introduced into the acid leg through line 44 at a point therein somewhat above the extreme bottom of the leg, above the sludge outlet. The pentane, having a specific gravity less than the sludge, percolates upwardly through the column of sludge contained in the acid leg and as it does so, it extracts the undesired saturated hydrocarbons from the sludge. The pentane extractant fills the upper tank-like portion of the apparatus and under continuous operation, with the entire system in equilibrium, the pentane flows out of extractor 300 through line 50 containing valve 51 and pump 52 which forces the pentane layer into the hydrogen fluoride stripper as heretofore described. When the process is operated under continuous flow, as is normally the case in commercial operation, the extracted sludge is removed through line 80 containing valve 81 as rapidly as raw sludge is introduced into the extractor through line 40. Pentane is also charged into extractor 300 at a rate consistent with the desired flow and at a rate sufficient to maintain at all times a two layer system in the tank-like portion of extractor 300.

According to the method herein described for the preparation of an improved drying oil hydrocarbon product from a hydrogen fluoride sludge, conditions are established and a process is operated in such a manner that the resulting drying oil product is composed of hydrocarbon components having a relatively large number of conjugated as well as non-conjugated double bonds per molecule which thereby give the drying oil product the ability to dry rapidly and completely to a hard tough film on exposure to air. The above objectives are obtained by carefully controlling the conditions under which the sludge is decomposed and by operating the decomposition stage of the process so that the polymerization of the drying oil hydrocarbons is maintained at a minimum. I have found that polymerization or condensation of the drying oil components during this decomposition step is a most significant factor in determining the number of conjugated and non-conjugated unsaturated bonds contained in said drying oil hydrocarbons and therefore, also, the drying efficiency of the product.

In the present method of this invention for the sludge decomposition stage of the process, a catalyst is utilized which has the ability to release the unsaturated drying oil hydrocarbons from combination with the hydrogen fluoride in said sludge at a lower temperature and at a higher rate of speed than may be accomplished by strictly thermal decomposition in the absence of said catalyst. The method effects the immediate separation of the drying oil hydrocarbons and hydrogen fluoride following the liberation of these components from the sludge, thus substantially eliminating the contact period between the drying oil hydrocarbons and the free hydrogen fluoride in the reactor and obviating a major factor causing polymerization of the drying oil product. I believe the catalyst serves a further purpose in that its surface also inhibits polymerization and condensation of the hydrocarbons released in the decomposition.

According to the present process, the hydrogen fluoride sludge is charged at a suitable temperature into a packed flashing column containing as a packing material a catalytic agent of the class hereinafter specified. In one typical method of operation, the sludge just prior to being charged into the catalytic decomposition tower is preheated to a temperature of from about 50° to about 200° C., depending upon whether atmospheric pressure or a pressure above or below atmospheric is employed in the decomposition tower. I have found that a particularly desirable arrangement for conducting the present process is that of heating the sludge to a temperature of from about 125° to about 200° C. under a slightly superatmospheric pressure immediately before it enters the decomposition tower while maintaining said tower at about atmospheric pressure or lower. The hydrogen fluoride released by contact of the sludge with the decomposition catalyst in the catalytic flashing tower may then be compressed and condensed with relative ease. Alternatively, the catalytic decomposition may be carried out at a pressure sufficiently above admospheric so that the liberated hydrogen fluoride may be condensed with ordinary cooling water without further compression.

During the catalytic decomposition of the sludge or just prior to its introduction into the catalytic decomposition column, it may be mixed with a non-reactive diluent, usually a saturated hydrocarbon such as a paraffin, which boils within such a range that a substantial portion of it remains liquid during the sludge decomposition stage but at a temperature sufficiently below the boiling point of the drying oil product to be readily separable therefrom by distillation of the mixture. It is preferred, for the conditions of operation specified herein that the diluent hydrocarbon boils within the range of from about 120° to about 150° C. although this boiling range may be varied according to other operating conditions. The hydrocarbon diluent has the effect of reducing polymerization of the unsaturated drying oil hydrocarbons released in the decomposition by physically dispersing the latter hydrocarbon molecules into an inert medium. The diluent also carries the released drying oil hydrocarbons downwardly through the decomposition column as the more volatile hydrogen fluoride passes upwardly through the column and escapes into the vapor line. The diluent thus effectively removes the drying oil hydrocarbons from the sphere of active polymerization catalyzed by hydrogen fluoride, a normally active polymerization catalyst. The inert hydrocarbon diluent appearing as a bottoms fraction with the desired drying oil product in the decomposition column is subsequently removed from the mixture and may be recycled to the catalytic decomposition column. One type of diluent which I particularly prefer because of its inertness to hydrogen fluoride and because it may be readily separated from the drying oil hydrocarbons in a subsequent fractionation step is the naphtha fraction of a straight-run petroleum distillate and preferably a fraction boiling from about 130° to about 150° C. The naphtha, in a preferred embodiment of the present invention, is mixed with the sludge just prior to the introduction of the sludge into the catalytic decomposition column, although the naphtha may also be introduced in the column as a separate stream. Another preferred inert diluent comprises certain fractions boiling in the desired range of the saturated upper layer hydrocarbons separated in vessel 30.

As operated by the above series of steps, the process results in the separation of a gaseous hydrogen fluoride effluent removed from the top of the catalytic decomposition column containing from about 90 to over 99% hydrogen fluoride, depending upon the conditions maintained in the column, such as the rate of throughput, etc. As a bottoms product or residue in the column, a hydrocarbon fraction comprising the desired drying oil product of the present process containing hydrocarbons having a high degree of conjugated and non-conjugated unsaturation in solution with the naphtha diluent is removed from the decomposition column.

The mixture of sludge and naphtha may be heated or cooled prior to its introduction into the flashing column containing the sludge decomposition catalyst, or the naphtha or sludge may be separately heated or cooled in order to control the heat input into the decomposition vessel, it being particularly advantageous at times to introduce the preheated naphtha in vaporous form. If the sludge is brought to the optimum temperature for decomposition prior to its contact with the catalyst the column does not under these conditions require external heating and may be operated as an adiabatic reactor. It may be heated however, if, for example, the rate of through-put caused an undesirably large temperature drop in the column. According to another method of operation, the mixture of sludge and naphtha is introduced cold or at ambient temperatures into a heated flash decomposition column maintained by external heating at the optimum temperature to effect the decomposition of the sludge.

The catalysts utilizable in the present process for decomposition of hydrogen fluoride sludges broadly comprise those substances which are solid at the temperatures specified for the operation of the process and which are substantially inert to the continued action of free hydrogen fluoride. In addition to these properties, the catalytic packing material should possess the following physical and mechanical properties: (1) It should be capable of accelerating the decomposition of the hydrogen fluoride-hydrocarbon complexes contained in the sludge; (2) it should not catalyze, but should rather inhibit, the condensation or polymerization of the drying oil hydrocarbons liberated in the sludge decomposition; and (3) it should not catalyze or promote cracking of the liberated hydrocarbons into short chain length hydrocarbon molecules. Generally speaking, the requirement that the catalyst be inert to the continued action of hydrogen fluoride eliminates such materials as silica-containing substances and metals which are readily attacked by free anhydrous hydrogen fluoride, especially those metals high in the electromotive series of elements. I have found that certain metals and special forms of non-activated carbon are especially desirable catalysts for the decomposition reaction. Of the metals I prefer to utilize copper, aluminum, cobalt, lead, cadmium and certain alloys of copper such as brass. The products recovered from the decomposition of the hydrogen fluoride sludge in the presence of metallic copper as catalyst is generally in a highly desirable condition; the percentage recovery and concentration of hydrogen fluoride is high so that the hydrogen fluoride may be recycled in the process without extensive removal of water therefrom; and the recovery of drying oil hydrocarbons approaches a maximum and the hydrocarbons thus recovered retain a large percentage of their original conjugated and non-conjugated unsaturation which characterize the drying oil hydrocarbons immediately upon release of the hydrocarbons from the sludge.

Referring again to Figure 1 which indicates the preferred flow in the present process, the pentane extracted sludge separating as a lower layer in pentane settler 49 is removed by means of pump 82 through line 80 containing valve 81 and mixed with the inert hydrocarbon diluent referred to above (preferably a naphtha fraction boiling from about 130° to about 150° C.) as it flows through line 80, said diluent entering line 80 by connection with line 84 which feeds the diluent into the system. The diluent, hereinafter specified as the preferred naphtha fraction, supplied from any convenient source, but usually from a naphtha reservoir connected to the system, is introduced through line 85, through valve 86 and valve 87 and is dried by passage through naphtha dryer 88 containing a dessicating material such as alumina. The naphtha is preferably introduced into the bottom of the naphtha dryer and flows through said dryer contacting therein the dessicant to the top thereof into line 84 containing valve 89 and into line 80 where it mixes with the sludge as previously noted. Although the process is in general operable when utilizing any proportion of naphtha to sludge, it is preferred to maintain the proportion at from about 0.5:1 to about 10:1 volumes of naphtha per volume of sludge. The mixture of sludge and naphtha is forced by means of pump 82 into heat exchanger 90 wherein the mixture is heated to a temperature of from about 50° to about 200° C., preferably up to about 150° C. The mixture, after being heated to the desired temperature, exits heat exchanger 90 by way of line 91 through valve 92 into catalytic sludge decomposition column 93 wherein the sludge is decomposed in the presence of a catalyst of the type hereinabove specified to release a vaporous fraction containing hydrogen fluoride and a liquid fraction comprising the drying oil product dissolved in the naphtha diluent. The mixture charged into the sludge decomposition column is introduced at a point in the upper portion of said column so that the hydrogen fluoride, which is immediately released upon coming in contact with the sludge decomposition catalyst, is rapidly carried out of the column through vapor line 94 containing valve 95 into condenser 96 wherein the gaseous hydrogen fluoride is cooled to a liquid fraction which is removed from condenser 96 through line 97, valve 98, into the receiver 99.

According to one of the preferred alternative means of operating the improved sludge decomposition process hereinabove briefly outlined in a specific embodiment of the present invention, an inert gaseous carrier is introduced into the bottom of the sludge decomposition reactor to strip the hydrogen fluoride vapors released by the sludge decomposition reaction from contact with the drying oil hydrocarbons likewise released by the decomposition of the sludge. The inert gaseous carrier herein referred to is a substance which remains gaseous under the temperature and pressure conditions at which the decomposition reactor is operated and which does not react in any manner with the sludge, hydrogen fluoride, or drying oil hydrocarbons present in the reactor during the decomposition process. Generally speaking, such gases include oxygen-free nitrogen, an oxide of carbon, preferably carbon monoxide, and low molecular weight paraffinic hydrocarbons such as methane, ethane, propane, the butanes, etc. which have been thoroughly dried prior to their introduction into the decomposition reactor. Moreover, the inert carrier may be a substance which is liquid under normal conditions but which may be vaporized by heating; the resultant vapor is then utilized in its vapor state as the gaseous carrier herein specified. The normally liquid substance is usually a paraffinic hydrocarbon, but whatever its composition, it must be substantially insoluble in liquid hydrogen fluoride, so that it may be subsequently separated therefrom and recycled in the process. The preferred gaseous carriers are the low molecular weight paraffins and of these I prefer to utilize those below pentane in molecular weight. The gaseous carrier is desirably heated to approximately the sludge decomposition temperature, and preferably to a temperature somewhat higher, within the range of from about 150° to about 300° C., depending upon the temperature selected for operation of the decomposition reactor. The rate at which the gas is introduced into the reactor is carefully controlled so that the heat input necessary to accomplish the decomposition of the hydrogen fluoride sludge is maintained within the range desired, while at the same time maintaining the rate of input sufficiently low to prevent entrainment and carryover of sludge and/or hydrocarbons into the hydrogen fluoride vapor stream. The rate of input which I have found to be especially suitable for the present process is within the range of from about 0.1 to about 10 volumes of gas per volume of reactor space per minute, but at a rate such that the total vapor velocity in the reactor does not exceed about 0.5 ft. per second, although this rate is also dependent upon the rate of charging the sludge, the temperature of the decomposition reactor, the size of the particles of sludge decomposition catalyst and other factors affecting the reaction. These factors may be determined for the particular operation by experimental procedure and no attempt shall be made here to define specifically the limits thereof because of their mutual relationship with the conditions affecting the decomposition reaction.

The catalytic sludge decomposition reactor is ordinarily a tube reactor containing a fixed bed of relatively loosely packed catalyst particles with void spaces between said particles to allow for the passage of the liquid sludge and vapors through the catalyst bed. When an attempt is made to introduce heat into the reaction zone to effect the endothermic sludge decomposition reaction by heating the outside walls of the decomposition reactor it is found that the reactants, within the reactor adjacent to the outside wall where heat is applied, are increased in temperature to a point considerably higher than the average temperature desired for the reaction, while the reactants at the center of the decomposition reactor which receive heat only by conduction through the catalyst bed do not receive sufficient heat for the optimum sludge decomposition. Thus, an undesirable temperature gradient exists within the catalytic reactor resulting in the temperature of the reactants adjacent to the source of heat being too high, causing deterioration of the drying oil hydrocarbons, while the temperature of the sludge at the center of the column is below the value at which optimum sludge decomposition takes place. Furthermore, in the alternative means of introducing the heat of decomposition into the reactor by heating the sludge, it is found that in order to heat the sludge to the temperature required for complete decomposition, considerable polymerization of the product results thereby.

I have found that a large proportion of the heat required for the sludge decomposition reaction may be introduced into the reactor by heating the inert carrier gas to the above preferred temperature and by means of this modification it is not necessary to heat the sludge to a temperature in which the drying oil product begins to rapidly deteriorate. Since the inert gaseous carrier is introduced into the bottom of the decomposition reactor, the gas flows upwardly through the bed of catalyst, countercurrent to the downward flow of sludge and thus, not only carries heat into the center of the decomposition column, but also carries out the hydrogen fluoride vapor from the decomposition reactor, thereby preventing furthere contact with the drying oil product. The overall recovery of hydrogen fluoride is also increased because the hydrocarbon product collecting as a bottoms fraction in the reactor is free of substantially all of the hydrogen fluoride which is normally dissolved in the product and which ordinarily (in the absence of the present embodiment of utilizing the carrier gas) would be subsequently washed to remove therefrom said dissolved hydrogen fluoride.

Referring to Figure 1 which diagrammatically presents the flow of the present process, the inert carrier gas is introduced into the system from a reservoir of the gas, not shown on the diagram, through line 101' at a temperature of from about 150° to about 300° C., through valve 102' and is increased in pressure by compressor 103' to force the flow of the gas through the catalyst bed in the decomposition reactor. The carrier gas, at its desired pressure, leaves said compressor through line 104' and enters sludge decomposition column 93 through the bottom of reactor, flowing upwardly through the catalyst distributed in reactor 93 and stripping hydrogen fluoride from the sludge as the latter flows downwardly through the reactor. The combined inert gas and hydrogen fluoride effluent exits the reactor through line 94 containing valve 95 and passes into hydrogen fluoride condenser 96 wherein only the hydrogen fluoride from the vaporous effluent is condensed. The inert gaseous carrier and liquid hydrogen fluoride flow out of condenser 96 through line 97 containing valve 98 and enters receiver 99 wherein the liquid hydrogen fluoride accumulates as a liquid condensate while the gaseous carrier separating from the hydrogen fluoride therein is pumped through line 105' containing pump 106' and is recycled to the bottom of reactor 93 through line 107' containing valve 108' into line 104'. When the inert gaseous carrier utilized in the process is a substance which is liquid at normal conditions and at the temperature at which the hydrogen fluoride is liquified in condenser 96, both liquids separate in settler 99 as two distinct layers, a lower hydrogen fluoride layer and an upper liquid layer. In connection with the use of an inert liquid it is usually necessary to supply a heat exchanger in line 105', but not shown on the diagram, to vaporize the inert liquid before introducing the same into line 104' and recycling the inert vapor into reactor 93.

Referring again to the liquid hydrogen fluoride layer which separates in receiver 99, all or a portion of the same may be withdrawn from said receiver 99 and recycled to stripper 39 to provide for sufficient hydrogen fluoride reflux in the latter vessel. For this purpose, the liquid hydrogen fluoride is withdrawn through line 100, valve 101, pump 102, line 103, through valve 104 and discharged into line 55 which connects with line 31 supplying the charge to said hydrogen fluoride stripper 39. Under normal operation, however, it is generally preferred to recycle a major proportion of the hydrogen fluoride contained in receiver 99 back to contactor 9 wherein the sludge of the present process is produced. To this end, the hydrogen fluoride is removed through line 105, valve 106, pump 107, and line 108 connecting with line 66 which feeds the hydrogen fluoride through valve 67 into line 24 leading to the hydrogen fluoride reservoir or into line 26 through valve 27 into contactor 9 for recycling purposes.

In order to control the water content of the hydrogen fluoride in the present process and maintain its concentration at its optimum value of approximately 95 to about 99% hydrogen fluoride, a portion of the hydrogen fluoride in line 108 from reservoir 99 is continuously removed from the hydrogen fluoride stream to separate water therefrom in the form of a constant-boiling azeotrope of hydrogen fluoride and water containing about 40–50% of the latter component. Thus, a portion of the acid stream in line 108 is removed therefrom through line 109, valve 110 and heat exchanger 111 to hydrogen fluoride dehydration column 112 which may be a fractionator or merely a flash chamber in which the heated hydrogen fluoride is distilled to remove fractions of the desired composition. In column 112 any water that is present in the hydrogen fluoride is concentrated in the higher boiling reflux condensate, usually an azeotropic or constant boiling mixture (indicated on Figure 1 as C. B. M.), of water and hydrogen fluoride withdrawn from column 112 through line 113 and valve 114. Dry hydrogen fluoride is withdrawn over-head from dehydrating column 112 through line 115 and valve 116 and is passed into condenser 117 where the hydrogen fluoride vapors are liquefied. The condensed liquid hydrogen fluoride is withdrawn from condenser 117 through line 118 containing valve 119 and run into receiver 120. Usually a portion of the hydrogen fluoride condensate is withdrawn from receiver 120 through line 121 which connects with line 122 containing valve 123 and is forced by pump 124 into line 125 containing valve 126 to supply sufficient hydrogen fluoride reflux into dehydrating column 112. A major proportion of the anhydrous hydrogen fluoride condensate in receiver 120 is recycled into the hydrogen fluoride supply line by withdrawing the same through line 121, valve 127 and pumping the same by means of pump 128, into line 129, through valve 130 from line 129 into line 66 leading to hydrogen fluoride supply line 26 or into storage through valve 25 and line 24.

As previously noted, the catalyzed sludge decomposition reaction occuring in column 93 effectively decomposes the hydrogen fluoride-drying oil complex contained in the sludge immediately upon the sludge coming in contact with the indicated decomposition catalysts. Depending upon the temperature and pressure at which column 93 is operated, the hydrogen fluoride vapor fraction which flashes over-head through line 94 when the mixture of sludge and naphtha contacts the catalyst, may contain from 90 to as high as 100% hydrogen fluoride. Drying oil hydrocarbons released by the decomposition reaction, in solution with the naphtha diluent, are relatively higher boiling than the hydrogen fluoride and accumulate in the bottom of column 93 from which they may be withdrawn through line 131 by manipulation of valve 132. Because the drying oil-naphtha hydrocarbon mixture usually dissolves a small quantity of free hydrogen fluoride (less than about 0.5% at atmospheric pressure), unavoidably retained by the mixture in solution or combination therewith, the mixture is preferably contacted with an alkaline reagent to neutralize the residual free hydrogen fluoride dissolved therein and thus reducing the possibility of the drying oil hydrocarbons polymerizing when the mixture is subsequently heated to fractionate therefrom the naphtha diluent. It is well known that hydrogen fluoride is an active polymerization catalyst and it is therefore desirable to remove all traces of the free reagent from the present product. This is even more apparent when it is realized that the highly unsaturated drying oil hydrocarbons tend to polymerize at even mild conditions of temperature and pressure which is enhanced in the presence of minute quantities of the hydrogen fluoride polymerization catalyst.

The bottoms product from column 93, withdrawn through line 131 and valve 132, is conveyed by means of pump 133 into line 134, through valve 135 and is charged into the bottom of caustic scrubber 136 where the hydrocarbon mixture comprising said bottoms product is allowed to percolate upwardly through a stream of aqueous caustic flowing downwardly through the column from its point of introduction at the top thereof through line 137 containing valve 138. The caustic scrubbing solution may be of any concentration, but preferably a solution having a low viscosity (such as a solution containing up to about 10% sodium hydroxide) is utilized in column 136. Column 136 may also contain a suitable packing material, such as quartz chips or particles of ceramic ware to increase the surface contact between the hydrocarbons and caustic solution and thus effect a more efficient scrubbing action. Instead of utilizing an aqueous solution of caustic in scrubbing tower 136, it may be alternatively packed with a suitable solid alkaline reagent. Soda lime, being a particularly effective and inexpensive reagent, may be utilized as the solid alkaline reagent to effect neutralization and removal of any dissolved hydrogen fluoride in the hydrocarbon mixture. A particular advantage is also obtained in the use of a solid alkaline reagent instead of the aqueous caustic solution in that the subsequent water scrubbing treatment and naphtha dryer 88, which removes water from the recycled naphtha fraction, may be thereby eliminated from the process flow. When employing the aqueous caustic solution, used or partially spent caustic solution gradually gravitates into the bottom portions of scrubber 136 and is drawn off through line 139 containing valve 140 to recycle line 138 if the solution contains any unused caustic dissolved therein. If relatively spent, the solution is merely discharged from the process.

The hydrocarbon fraction which rises to the top of column 136 and accumulates in that portion, is withdrawn through line 141 containing valve 142 and by means of pump 143 the hydrocarbon mixture is forced through line 144 containing valve 145 into water scrubbing column 146 where again, the hydrocarbons, being lighter than the water, percolate upwardly through the column and accumulate at the top thereof. Fresh or recirculated water is introduced into the top of the column through line 147 containing valve 148 and after flowing downwardly through the rising stream of hydrocarbons in column 146 is withdrawn through line 149 and valve 150.

The hydrocarbon mixture containing naphtha and the desired drying oil product accumulating in the top of scrubber 146, being free of dissolved hydrogen fluoride, may now be subjected to higher temperatures without danger of marked polymerization of the drying oil hydrocarbons. In order to separate the naphtha fraction from the desired drying oil product the washed hydrocarbon mixture of the two is transferred by means of pump 153 through line 151 containing valve 152 and line 154 containing valve 155 into heat exchanger 156 wherein the hydrocarbons are heated to a temperature within the range of from about 150° to about 200° C., which is somewhat above the boiling range of the present naphtha fraction. From heat exchanger 156 the hydrocarbon mixture is conveyed through line 157 containing valve 158 into naphtha fractionator 159 in which the lower boiling naphtha hydrocarbons are vaporized from the higher boiling drying oil hydrocarbons. The over-head vapors from fractionator 159, comprising essentially the naphtha fraction originally introduced into the system, pass through line 160 containing valve 161 into condenser 162 which has a rundown line 163 leading to receiver 164. The naphtha fraction accumulating in the latter receiver passes through line 165 containing valve 166 to pump 167 which recycles the naphtha fraction through line 168 and valve 169 into line 85, thus returning the naphtha either to the naphtha reservoir (indicated as naphtha make-up) or through valve 87 into naphtha drier 88 for recycling into the process flow. Any water contained in the naphtha from the aqueous scrubbers heretofore mentioned is removed in naphtha dryer 88 before recycling the same into the process. Although in the above description it has been shown to be advantageous to caustic-wash the naphtha-drying oil mixture prior to distillation, it has sometimes been found more convenient (particularly when the separation of HF in column 93 is virtually complete) to caustic-wash after the distillation in fractionator 159, in this case it is necessary to wash only the drying oil recovered as bottoms.

The higher boiling drying oil hydrocarbons separated from the naphtha diluent in fractionating column 159 accumulate as a bottoms fraction in said column and are withdrawn therefrom through line 170 containing valve 171 and are charged by means of pump 172 into the drying oil fractionator hereinafter referred to. The drying oil product prepared in the present process is essentially a mixture containing hydrocarbons having various molecular weights, although the general structures and degrees of conjugated and non-conjugated unsaturation is similar in all fractions. Since the higher-boiling hydrocarbons contained in the drying oil product are more effective as drying oils than the lighter, more volatile components contained in the same mixture, it becomes desirable to make a separation of the more effective hydrocarbons from the components of lesser value. I have found in addition that a light oil fraction boiling from the initial boiling point up to about 300° or 325° C. at normal conditions is especially desirable for the preparation of resins therefrom by condensation of the fraction with other reactive organic compounds such as maleic anhydride, etc. but less desirable as a drying oil because of its volatility. A medium oil fraction containing hydrocarbon components of higher molecular weight than the components of the light oil fraction boils from about 300° to about 400° C. at normal conditions and this fraction has been found to possess valuable properties as a drying oil component in paints and varnishes and other coating compositions. If further separation of the product is desired, a heavy oil fraction containing hydrocarbon components having the highest molecular weight in the drying oil product may be separated as a residue or bottoms fraction from the drying oil fractionator and this fraction boils from about 400° C. up to the end boiling point. The latter fraction may also be used in coating compositions since it is partly resinous and further polymerizes and oxidizes on exposure to air to form a tough hard film. The present product is usually fractionated at a sub-atmospheric pressure (which may range from about 10 mm. up to atmospheric pressure) to effect desirable separation and reduce the temperature to which the product must be heated in order to effect fractionation. The reduction in the boiling point temperature effected by lowering the column pressure eliminates or substantially reduces the tendency of the drying oil product to undergo thermal cracking into lower molecular weight hydrocarbons containing fewer unsaturated bonds. The vacuum may be maintained on the drying oil fractionating column by any suitable means such as the conventional vacuum pumps or aspirators inserted into any one of the vapor lines leading from the fractionator.

For purposes of the present description, a vacuum fractionation procedure will be described, although it is to be understood that fractionation at atmospheric pressure is also practicable and within the scope of the present invention. In the preferred operation of the present drying oil fractionation system, the pressure is maintained at approximately within the range of from about 10 to about 100 mm. of mercury absolute. The bottoms fraction removed from fractionator 159 through line 170 and valve 171 is transferred by means of pump 172 into line 173 containing valve 174, through heat exchanger 175 wherein the temperature of the charge is increased to about 300° C. The charge exits heat exchanger 175 through line 176 containing valve 177 and is introduced into drying oil fractionator 178 in the upper portion thereof where a light vapor fraction, boiling below about 300° C. at normal conditions, immediately flashes from the column into vapor line 179 containing valve 180 and is conveyed into condenser 181 where the vapor liquefies into a light oil fraction. The latter flows through rundown pipe 182 containing valve 183 into receiver 184 from which it is withdrawn through line 185 containing valve 186 into storage or to a plant, not shown in the diagram where it is converted into by-products. Preferably, a portion thereof is withdrawn from line 185, through line 187 and valve 188, and is transferred by means of pump 189 into line 190 containing valve 191, and discharged into the top of fractionator 178 to provide said fractionator with a reflux stream.

The medium oil fraction, hereinabove referred to and containing the preferred drying oil hydrocarbons, is withdrawn from fractionator 178 at a point intermediate between the uppermost and bottom plates in the fractionator corresponding to the desired boiling range at the medium oil fraction through line 192 containing valve 193, and is collected in receiver 194. Vapors withdrawn with the liquid fraction and separating therefrom in receiver 194 are returned to the fractionator through line 194' to a higher plate in the column than the plate from which the fraction was removed. The medium oil fraction, boiling from about 300° to about 400° C. at normal conditions, is withdrawn from receiver 194, through line 195, cooling heat exchanger 196, line 197, and valve 198 into storage or to further points of utilization. The heavy oil fraction boiling from 400° C. up to the final boiling point at normal conditions is removed as a bottoms product from fractionator 178 through line 197, cooler 200, and line 200' and valve 200'' into storage.

For the sake of simplicity in the description of Figure 1, certain conventional units of apparatus, such as reboilers on the distillation columns and pressure control pumps have been omitted from the diagram. As an alternative in the fractionation of the naphtha-drying oil hydrocarbon mixture, it is also within the scope of the present invention to fractionate the mixture at atmospheric pressure and to eliminate the separation of the heavy drying oil fraction boiling from 400° C. and upwards, thereby making it possible to distill the naphtha fraction from drying oil hydrocarbons in a single column from which the naphtha fraction would be removed as the lowest boiling cut, the light oil fraction would be removed as a cut boiling at a somewhat higher temperature, up to about 300° C. (at normal conditions) and a combined medium and heavy drying oil fraction would be removed from the fractionator as a bottoms material. It is, however, preferred, when it is desired to separate a product having maximum utility, to operate the process in the manner as heretofore described, that is by distilling the naphtha fraction from the drying oil product at atmospheric pressure and in a separate column, fractionating the drying oil at a subatmospheric pressure.

The unsaturated hydrocarbon fraction recovered from the hydrogen fluoride sludge and separated in the catalyst-packed column as a high boiling bottoms product according to the present process contains a series of high molecular weight cyclic compounds of wide boiling range, but of generally homologous structure which contain conjugated olefinic double bonds, although the exact composition of the fraction will vary somewhat depending upon the particular charging stock, the catalyst utilized in the decomposition, and the conditions of operation employed. Infrared and ultra-violet adsorption studies as well as other analytical data determined on the unsaturated hydrocarbon material have shown that the polyenes contained therein are of cyclic structure but are substantially non-aromatic, and have isolated unsaturation in addition to the conjugated unsaturation, and that the four carbon atoms which constitute the conjugated system in said hydrocarbons are highly substituted, possessing, on the average, fewer than two hydrogen atoms per mol as substituents.

Representative unsaturated polyolefinic hydrocarbon fractions which I have prepared and analyzed usually have a wide boiling range of from about 150° to over 450° C., density of about 0.83 to about 0.93, index of refraction of about 1.47 to about 1.53 (but usually 1.48 to 1.50), specific dispersion of about 125 to about 175 (but usually between 135 and 145), bromine numbers above about 140 (although they vary considerably with the average molecular weight), maleic anhydride values of about 30 to about 90 (usually in the range of about 45 to 85), acid number below 3, average number of olefinic double bonds per molecule varying between about 2.5 and about 4, of which from about 40 to about 70 per cent are conjugated, and average molecular weights from about 200 to about 400, although the usual average is in the neighborhood of 300. Unsaturated hydrocarbon fractions derived from hydrogen fluoride sludges have also been prepared in which some of the hydrocarbons have molecular weights of as low as about 150 to as high as about 1000. Although hydrogen to carbon atomic ratios of the hydrocarbons contained in the unsaturated hydrocarbon fraction vary somewhat depending upon the particular source of the material, for a fraction derived from a polymer gasoline-hydrogen fluoride sludge they range from about 1.67 to about 1.72 (for the various fractions) with the actual weight percentages of hydrogen varying from about 12.35 to about 12.6.

The properties of the unsaturated hydrocarbon products will, of course, vary somewhat depending upon whether the entire boiling range of material or a specific fraction is obtained for analysis. In general, the lower boiling fractions have similar properties and are water-white to straw-yellow in color, while the higher boiling fractions are generally somewhat darker and may vary more in properties, with differences in charge stock, conditions of preparation, etc.

The unsaturated polyolefinic hydrocarbons containing conjugated and additional non-conjugated unsaturation recovered according to the present process have a special field of utility in the manufacture of drying oils, paints, varnishes, lacquers, shellac substitutes and other protective coatings and for this purpose they may be mixed with varying proportions of natural glyceride drying oils or utilized independently in the composition of said products. Besides being a particularly desirable drying oil, the product of the present process may be utilized in the preparation of resins and plastics and a variety of synthetic organic compounds. For example, the hydrocarbons may be condensed with dienophilic acid anhydrides such as maleic, itaconic and mesaconic acid anhydrides (or other derivatives) to form higher molecular weight acids or derivatives thereof. Such acids may be esterified or amidized to form resinous and plastic materials or other intermediates. The unsaturated properties of these hydrocarbons renders them suitable for halogenation to form halogen derivatives thereof from which insecticidal compositions may be prepared. Further, these hydrocarbons may be converted to derivatives of a variety of inorganic compounds for the preparation of detergents, siccatives, etc.

The following example is introduced for the purpose of illustrating the results obtainable by the process of the present invention, but it should not be construed so as to limit the scope of the invention disclosed herein or claimed in the following claims.

Example I

The hydrogen fluoride sludge was prepared according to the following procedure: The hydrocarbon charging stock was a codimer gasoline having a boiling range indicated by the following Engler distillation:

| Fraction | Boiling Point, °C. |
| --- | --- |
| Initial | 45 |
| 10% over | 96 |
| 30% over | 113 |
| 50% over | 120 |
| 70% over | 140 |
| 90% over | 203 |
| End Boiling point | 256 |

Two liters of the above codimer gasoline was gradually added under pressure and with stirring to 800 grams of anhydrous hydrogen fluoride. Stirring was continued for one hour at a temperature of from about 90° to about 95° C. followed by cooling the reactor and its contents to approximately 0° C. in an ice bath. The liquid products separated into two layers on standing, an upper hydrocarbon phase containing only a small amount of dissolved hydrogen fluoride which was removed and washed with a dilute solution of sodium hydroxide; and a lower sludge layer containing substantially all of the hydrogen fluoride charged to the reactor. The upper hydrocarbon layer after being washed with dilute sodium hydroxide and defluorinated by passing the same over alumina at 200° C. yielded a gasoline of 300° F. E. P. having a clear octane rating of 87.1 and a leaded octane rating (2 cc. of tetraethyl lead added per gallon of upper layer) of 99.1. The lower sludge layer formed in the sludge reactor was decanted therefrom and reserved for subsequent treatment as below. It contained approximately 57% of hydrogen fluoride (believed to be practically all in a combined state as a hydrogen fluoride-hydrocarbon addition complex) and 43% hydrocarbons.

The sludge prepared as indicated above was extracted to remove dissolved and/or entrained saturated hydrocarbons by shaking the same with one volume of liquid pentane. The mixture was allowed to settle and separate into two layers. The lower sludge layer was decanted and mixed with two volumes of a straight-run naphtha fraction boiling within the range of from about 130° to about 140° C. The latter mixture was then heated to about 125° C. and flashed into an externally heated catalytic sludge decomposition column packed with particles of metallic copper as catalyst, said particles ranging in size from about 3 to about 10 mesh. An overhead hydrogen fluoride vapor condensed into liquid hydrogen fluoride containing 99.4% hydrogen fluoride and amounted to 98.4% of the hydrogen fluoride charged to the decomposition tower. The bottoms product from the decomposition tower was washed with an aqueous 10% caustic solution followed by washing the hydrocarbon fraction with water. The recovered hydrocarbon layer was heated to about 200° C. and flashed into a fractionating column. The naphtha fraction flashing overhead as a vapor was condensed and recycled to the process while the bottoms were removed, heated to about 225° C. and flashed into a vacuum fractionator maintained at a pressure of approximately 10 mm. mercury absolute. The distillate was separated into three fractions indicated in the following table:

| Fraction | Yield, Weight Percent of Codimer Gaso. Charged | Boil. Point, °C. at Normal Conditions | Gardner Color | Diene No.[1] |
| --- | --- | --- | --- | --- |
| Light Oil | 16.3 | Initial—300° | <10 | 90 |
| Medium Oil | 21.5 | 300°—400° | 12 | 62 |
| Heavy Oil | 5.1 | 400° and up | >18 | 40 |

[1] Diene No. is defined as the number of centigrams of iodine equivalent to the amount of maleic anhydride which combines with one gram of sample.

I claim as my invention:

1. A process for the production of a hydrocarbon mixture containing polyolefinic, polycyclic hydrocarbons, the unsaturated bonds of which are non-aromatic and in conjugated as well as non-conjugated relation to each other, which comprises contacting an olefinic codimer gasoline fraction having a boiling range of from about 30° C. to about 250° C. with a hydrogen fluoride catalyst containing not more than about 10% water at reaction conditions that result in the formation of a hydrogen fluoride sludge containing a hydrocarbon-hydrogen fluoride addition complex, separating said sludge from the other reaction products, decomposing the hydrocarbon-hydrogen fluoride complex by passing said sludge over a sludge decomposition catalyst at reaction conditions that result in the formation of a hydrogen fluoride vapor phase and a liquid hydrocarbon phase, and separating said liquid hydrocarbon phase as said polyolefinic, polycyclic hydrocarbon mixture.

2. A process for the production of a hydrocarbon mixture containing polyolefinic, polycyclic hydrocarbons, the unsaturated bonds of which are non-aromatic and in conjugated as well as non-conjugated relation to each other, which comprises contacting an olefinic hydrocarbon containing at least 4 carbon atoms per molecule with a hydrogen fluoride catalyst containing not more than about 10% water at reaction conditions that result in the formation of a hydrogen fluoride sludge containing a hydrocarbon-hydrogen fluoride addition complex, separating said sludge from the other reaction products, mixing said sludge with an inert hydrocarbon diluent having an end boiling point not in excess of about 150° C. in a volume ratio of said diluent to said sludge within the range of from about 0.5 to about 10, passing the resultant mixture of sludge and diluent over a sludge decomposition catalyst at reaction conditions such that said diluent is retained in substantially liquid phase and said sludge is decomposed into a hydrogen fluoride vapor phase and a liquid hydrocarbon phase, removing said liquid hydrocarbon phase from the sludge decomposition zone and fractionating said liquid hydrocarbon phase into a fraction comprising said polyolefinic, polycyclic hydrocarbon mixture and a fraction comprising said hydrocarbon diluent.

3. The process of claim 2 further characterized in that said inert hydrocarbon diluent comprises a paraffinic hydrocarbon having a normal boiling point within the range of from about 120° C. to about 150° C.

4. The process of claim 2 further characterized in that said inert hydrocarbon diluent is a straight-run naphtha fraction having a boiling point within the range of from about 120° to about 150° C. at normal conditions.

5. A process for the production of a hydrocarbon mixture containing polyolefinic, polycyclic hydrocarbons, the unsaturated bonds of which are non-aromatic and in conjugated as well as non-conjugated relation to each other, which comprises contacting an olefinic hydrocarbon containing at least 4 carbon atoms per molecule with a hydrogen fluoride catalyst containing not more than about 10% water at reaction conditions that result in the formation of a hydrogen fluoride sludge containing a hydrocarbon-hydrogen fluoride addition complex, separating said sludge from the other reaction products, extracting said sludge with a paraffinic hydrocarbon which is in liquid phase and substantially inert under the conditions of extraction, to remove from said sludge the entrained and dissolved saturated hydrocarbons therein, decomposing the hydrocarbon-hydrogen fluoride complex by passing said sludge in admixture with an inert liquid hydrocarbon diluent over a sludge decomposition catalyst at reaction conditions that result in the formation of a hydrogen fluoride vapor phase and a liquid hydrocarbon phase, and separating said liquid hydrocarbon phase containing said polyolefinic, polycyclic hydrocarbon mixture.

6. The process of claim 5 further characterized in that said paraffinic hydrocarbon comprises pentane.

7. A process for the production of a hydrocarbon drying oil which comprises contacting an olefinic hydrocarbon containing at least 4 carbon atoms per molecule with a hydrogen fluoride catalyst containing not more than about 10% water at reaction conditions that result in the formation of a hydrogen fluoride sludge containing a hydrocarbon-hydrogen fluoride addition complex, separating said sludge from the other reaction products, mixing said sludge with an inert hydrocarbon diluent having an end boiling point not in excess of about 150° C. in a volume ratio of said diluent to said sludge within the range of from about 0.5 to about 10, passing the resultant mixture of sludge and diluent over a sludge decomposition catalyst at reaction conditions such that said diluent is retained in substantially liquid phase and said sludge is decomposed into a hydrogen fluoride vapor phase and a liquid hydrocarbon phase, removing said liquid hydrocarbon phase from the sludge decomposition zone and fractionating the liquid hydrocarbon phase into a fraction comprising said inert hydrocarbon diluent as the lowest boiling fraction thereof, a light oil fraction boiling up to about 300° C. at normal conditions and a bottoms fraction comprising the residue of said liquid hydrocarbon phase, and recovering said bottoms product.

8. A process for the production of a hydrocarbon drying oil which comprises contacting an olefinic hydrocarbon containing at least 4 carbon atoms per molecule with a hydrogen fluoride catalyst containing not more than about 10% water at reaction conditions that result in the formation of a hydrogen fluoride sludge containing a hydrocarbon-hydrogen fluoride addition complex, separating said sludge from the other reaction products, mixing said sludge with an inert hydrocarbon diluent having an end boiling point not in excess of about 150° C. in a volume ratio of said diluent to said sludge within the range of from about 0.5 to about 10, passing the resultant mixture of sludge and diluent over a sludge decomposition catalyst at reaction conditions such that said diluent is retained in substantially liquid phase and said sludge is decomposed into a hydrogen fluoride vapor phase and a liquid hydrocarbon phase, removing said liquid hydrocarbon phase from the sludge decomposition zone and fractionating at atmospheric pressure said liquid hydrocarbon phase into an overhead fraction comprising said inert hydrocarbon diluent and a bottoms fraction comprising a high boiling mixture of unsaturated hydrocarbons and fractionating said bottoms fraction at a subatmospheric pressure within the range of from about 10 to about 100 mm. of mercury absolute to separate a light oil fraction boiling up to about 300° C. at normal conditions, a medium oil fraction boiling within the range of from about 300° to about 400° C. at normal conditions and a higher boiling bottoms fraction comprising the remainder of said liquid hydrocarbon phase, and recovering said bottoms product.

9. A process for the production of a hydrocarbon drying oil which comprises contacting an olefinic hydrocarbon containing at least 4 carbon atoms per molecule with a hydrogen fluoride catalyst containing not more than about 10% water at reaction conditions that result in the formation of a hydrogen fluoride sludge containing a hydrocarbon-hydrogen fluoride addition complex, separating said sludge from the other reaction products, mixing said sludge with an inert hydrocarbon diluent having an end boiling point not in excess of about 150° C. in a volume ratio of said diluent to said sludge within the range of from about 0.5 to about 10, passing the resultant mixture of sludge and diluent over a sludge decomposition catalyst at reaction conditions such that said diluent is retained in substantially liquid phase and said sludge is decomposed into a hydrogen fluoride vapor phase and a liquid hydrocarbon phase while at the same time passing a carrier gas inert to the action of said hydrogen fluoride sludge over the decomposition catalyst in countercurrent flow to said mixture of sludge and diluent, removing said liquid hydrocarbon phase and fractionating the same into a fraction comprising said inert hydrocarbon diluent and a fraction comprising said drying oil product.

10. A process for the production of a hydrocarbon drying oil which comprises contacting an olefinic codimer gasoline fraction having a boiling range of from about 30° C. to about 250° C. with a hydrogen fluoride catalyst containing not more than about 10% water at reaction conditions that result in the formation of a hydrogen fluoride sludge containing a hydrocarbon-hydrogen fluoride addition complex, separating said sludge from the other reaction products, passing said sludge over a sludge decomposition catalyst at reaction conditions that result in the formation of a hydrogen fluoride vapor phase and a liquid hydrocarbon phase while at the same time passing a carrier gas inert to the action of said hydrogen fluoride over the decomposition catalyst in countercurrent flow to said sludge, and removing the liquid hydrocarbon phase as said drying oil product.

11. The process of claim 9 further characterized in that said carrier gas is butane.

12. The process of claim 9 further characterized in that said carrier gas is propane.

13. The process of claim 2 further characterized in that said inert hydrocarbon diluent is a saturated hydrocarbon fraction boiling within the range of from about 120° to about 150° C.

14. A process for the production of a hydrocarbon drying oil which comprises reacting an olefinic hydrocarbon containing at least four carbon atoms per molecule in the presence of a hydrogen fluoride catalyst containing not more than about 10% water; separating the resultant reaction mixture into (1) an upper layer comprising saturated hydrocarbons formed during the reaction step and dissolved free hydrogen fluoride and (2) a lower layer comprising a hydrogen fluoride-hydrocarbon complex and a relatively minor amount of said saturated hydrocarbons; extracting said lower layer with a substantially inert liquid paraffin solvent to remove saturated hydrocarbons therefrom; separating a solvent phase containing said saturated hydrocarbons and dissolved free hydrogen fluoride from the thus extracted complex; catalytically decomposing the latter to convert said complex into a hydrogen fluoride vapor phase and a liquid hydrocarbon phase; commingling said solvent phase and said upper layer and distilling the resultant mixture to strip a fraction comprising vapors of free hydrogen fluoride and said solvent from said saturated hydrocarbons; condensing the stripped vapors to form a solvent layer and a hydrogen fluoride layer; returning said solvent layer to said extraction step; returning said hydrogen fluoride layer and hydrogen fluoride contained in said hydrogen fluoride vapor phase to said reaction step; and fractionating said liquid hydrocarbon phase to recover therefrom a drying oil comprising polyolefinic polycyclic hydrocarbons containing conjugated and non-conjugated unsaturation.

15. The process of claim 14 further characterized in that said extracted complex is catalytically decomposed in the presence of a substantially inert hydrocarbon diluent at reaction conditions such that said diluent is retained in substantially liquid phase, and said diluent is separated during said fractionation step and returned to said decomposition step.

16. The process of claim 14 further characterized in that said olefinic hydrocarbon is reacted at a temperature of from about 30° C. to about 125° C. and a pressure sufficient to maintain the reactants substantially in liquid phase.

17. A process for the production of a hydrocarbon drying oil which comprises reacting a polymer gasoline fraction in the presence of a hydrogen fluoride catalyst containing not more than about 10% water; separating the resultant reaction mixture into (1) an upper layer comprising saturated hydrocarbons formed during the reaction step and dissolved free hydrogen fluoride and (2) a lower layer comprising a hydrogen fluoride-hydrocarbon complex and a relatively minor amount of said saturated hydrocarbons; extracting said lower layer with liquid pentane to remove said saturated hydrocarbons therefrom; separating a pentane phase containing said saturated hydrocarbons and dissolved free hydrogen fluoride from the thus extracted complex; catalytically decomposing the latter to convert said complex into a hydrogen fluoride vapor phase and a liquid hydrocarbon phase; commingling said pentane phase and said upper layer and distilling the resultant mixture to strip a fraction comprising vapors of free hydrogen fluoride and said pentane from said saturated hydrocarbons; condensing the stripped vapors to form a pentane layer and a hydrogen fluoride layer; returning said pentane layer to said extraction step; returning said hydrogen fluoride layer and hydrogen fluoride contained in said hydrogen fluoride vapor phase to said reaction step; and fractionating said liquid hydrocarbon phase to recover therefrom a drying oil comprising polyolefinic polycyclic hydrocarbons containing conjugated and non-conjugated unsaturation.

18. The process of claim 17 further characterized in that said extracted complex is catalytically decomposed in the presence of a straight run naphtha fraction boiling within the range of from about 120° C. to about 150° C. at reaction conditions such that said naphtha is retained in substantially liquid phase, and said naphtha is separated during said fractionation step and returned to said decomposition step.

HERMAN S. BLOCH.

REFERENCES CITED

The following references are of record in the file of this patent:

UNITED STATES PATENTS

| Number | Name | Date |
|---|---|---|
| 2,322,800 | Frey | June 29, 1943 |
| 2,333,648 | Grosse et al. | Nov. 9, 1943 |
| 2,378,636 | Iverson | June 19, 1945 |
| 2,400,386 | Bolinger et al. | May 14, 1946 |
| 2,400,521 | Kuhn, Jr. | May 21, 1946 |
| 2,404,483 | Frey | July 23, 1946 |
| 2,413,868 | Frey | Jan. 7, 1947 |